US012699636B2

(12) United States Patent
Estulin et al.

(10) Patent No.: US 12,699,636 B2
(45) Date of Patent: Aug. 4, 2026

(54) SYSTEMS AND METHODS FOR EVALUATING CUSTOM AUDIENCE SEGMENTS

(71) Applicant: NBCUniversal Media, LLC, New York, NY (US)

(72) Inventors: Boris Estulin, Princeton Junction, NJ (US); Jeremy Elias Goldberg, Nashville, TN (US); Thomas Barr, Melbourne, FL (US)

(73) Assignee: NBCUniversal Media, LLC, New York, NY (US)

( * ) Notice: Subject to any disclaimer, the term of this patent is extended or adjusted under 35 U.S.C. 154(b) by 65 days.

(21) Appl. No.: 18/504,886

(22) Filed: Nov. 8, 2023

(65) Prior Publication Data

US 2025/0147852 A1 May 8, 2025

(51) Int. Cl.
G06F 11/22 (2006.01)

(52) U.S. Cl.
CPC ............................... G06F 11/2247 (2013.01)

(58) Field of Classification Search
CPC ........... G06F 11/2247; G06F 16/24545; G06Q 30/0254; G06Q 30/02–0277
See application file for complete search history.

(56) References Cited

U.S. PATENT DOCUMENTS 7,730,053 B2 * 6/2010 Sauermann ....... G06F 16/24545
                                                                707/769
9,866,426 B2 * 1/2018 Shelton ............... H04L 41/0631

9,916,350 B2 * 3/2018 Young ............... G06F 16/24537
10,031,938 B2 * 7/2018 Allen ................... G06F 16/2428
10,679,137 B2 * 6/2020 Villa ......................... G06N 7/01
11,593,339 B2 * 2/2023 Halstead ................. G06F 16/21
11,995,137 B2 * 5/2024 Nair .................... G06F 16/2428

(Continued)

OTHER PUBLICATIONS

Crama and Hammer, Boolean Functions: Theory, Algorithms, and Applications, Cambridge University Press, 2011, p. 67-111. (Year: 2011).*

(Continued)

*Primary Examiner* — Ilana L Spar
(74) *Attorney, Agent, or Firm* — Fletcher Yoder, P.C.

(57) ABSTRACT

A non-transitory, computer-readable medium includes instructions, that, when executed, cause processing circuitry to receive, from an electronic device, a request regarding a custom segment defined by a first Boolean expression of a plurality of segments having elements corresponding to, or representative of, one or more electronic devices and/or one or more users of the one or more electronic devices. The instructions, when executed, also cause the processing circuitry to generate a different, second Boolean expression based on the first Boolean expression and the plurality of segments. Additionally, the instructions, when executed, cause the processing circuitry to determine a number of distinct elements of the custom segment at least partially utilizing the second Boolean expression and a plurality of data structures corresponding to the plurality of segments. Furthermore, the instructions, when executed, cause the processing circuitry to send an indication of the number of distinct elements to the electronic device.

16 Claims, 4 Drawing Sheets

10

(56)                    References Cited

U.S. PATENT DOCUMENTS

| 2004/0158645 | A1* | 8/2004 | Morinaga | ............... | G06Q 30/02 |
| | | | | | 709/238 |
| 2017/0103417 | A1* | 4/2017 | Nguyen | ............ | G06F 16/24545 |
| 2018/0349933 | A1* | 12/2018 | Modarresi | .......... | G06Q 30/0204 |
| 2024/0061829 | A1* | 2/2024 | Margraff | ............... | G06F 16/285 |

OTHER PUBLICATIONS

Crow, "Appendix: Basics of Logic", 2022, https://faculty.nps.edu/ncrowe/book/aa.html, p. 1-3. (Year: 2022).*
Y. W. Yu and G. M. Weber, "HyperMinHash: MinHash in LogLog Space," in IEEE Transactions on Knowledge and Data Engineering, vol. 34, No. 1, pp. 328-339, Jan. 1, 2022, doi: 10.1109/TKDE.2020.2981311. (Year: 2022).*
Anonymous: "HyperLogLog—Wikipedia", 1-15, Dec. 29, 2017 (Dec. 29, 2017), XP055566897, Retrieved from the Internet:URL:https://en.wikipedia.org/w/index.php?title=HyperLogLog&oldid=817574818 [retrieved on Mar. 11, 2019].
European Search Report; EP Application No. 24203636; dated Mar. 1, 2025.

* cited by examiner

100

RECEIVE REQUEST REGARDING CUSTOM SEGMENT ~102

DETERMINE NUMBER OF DISTINCT ELEMENTS IN CUSTOM SEGMENT ~104

PROVIDE INDICATION OF NUMBER OF DISTINCT ELEMENTS IN CUSTOM SEGMENT ~106

PROVIDE DIGITAL CONTENT WITH SUPPLEMENTAL CONTENT BASED ON CUSTOM SEGMENT ~108

SEGMENT HUB FROM NBCUNIVERSAL    HOME    SEGMENTS    DATA OPS    PROCESSING    TOOLS    ADMIN

CAR COMPANIES SPANISH LANGUAGE OR LOCAL OR 50 YOUNGER MODEL   — 202, 204
AUTO I • FW

OVERVIEW    SEGMENT OVERLAP    FORECASTS    REFRESH    VERSIONS    PROCESSING LOG    CHANGE HISTORY   — 210

TOTAL IDS | ENTITY1 | ENTITY2 | IP ADDRESS | NBCUNIFIED | ENTITY3 | PEACOCK | ACTIVE CAMPAIGNS
934.4M | 390.8M | 306.5M | 117.7M | 76.6M | 24.7M | 17.8M | --

[EDIT SEGMENT]

SEARCH SEGMENTS BY NAME, FREEWHEEL ID, DESCRIPTION 🔍   — 206

GROUP BY  [216]   — 208

▾ ADVANCED FILTERS   ⬇ DOWNLOAD TO EXCEL   — 212   ( JUMP TO ANOTHER SEGMENT )

CAMPAIGN USAGE [DIRECT IO-ACTIVE ▾]   — 216   ID TYPES [ALL ID TYPES ▾]   ☑ INCLUDE ONLY LIKE ID TYPES IN TOTALS

| NAME | CAMPAIGN USAGE | IDS | TOTAL IDS OVERLAP | ↓% | ENTITY1 IDS | ENTITY1 OVERLAP | % | IP ADDRESS IDS | IP ADDRESS OVERLAP | % | ENTITY2 IDS | ENTITY2 OVERLAP | % | ENTITY3 IDS | ENTITY3 OVERLAP | % | NBCUNIFIED IDS | NBCUNIFIED OVERLAP | % | PEACOCK IDS | PEACOCK OVERLAP |
|---|---|---|---|---|---|---|---|---|---|---|---|---|---|---|---|---|---|---|---|---|
| CAR COMPANIES NBCU LOCAL MODEL ⬀ / DDL I AUTO I • FW — 214A | -- (218) | 524.3M | 522.0M | 55.9% | 206.5M | 205.5M | 52.6% | 63.7M | 63.9M (222) | 54.3% | 194.6M | 193.1M | 63% | 11.9M | 11.8M | 47.9% | 37.5M | 37.6M | 49.1% | 9.9M | 9.9M |
| CAR COMPANIES SPANISH LANGUAGE MODEL ⬀ / AUTO I • FW — 214B | -- | 481.0M | 480.8M | 51.5% | 190.6M | 190.4M | 48.7% | 59.0M | 58.2M | 49.5% | 171.1M | 171.5M | 56% | 12.4M | 12.5M | 50.6% | 38.4M | 38.6M | 50.4% | 9.2M | 9.3M |
| CUSTOM-ADVERTISER • BUSINESS WHITE LIST ⬀ / CROSS PLATFORM I BYOD-3P I CUSTOM I • FW — 214C | -- | 1.4B | 464.7M | 49.7% | 747.5M | 246.9M | 63.2% | 192.3M | 60.9M | 51.7% | 297.2M | 76.4M | 24.9% | 49.5M | 16.7M | 67.7% | 141.4M | 50.3M | 65.7% | 30.2M | 13.4M |
| CAR COMPANIES FUTURE BRAND Q2 2023 ⬀ / CROSS PLATFORM I BYOD-3P I CUSTOM I | -- | 1.1B | 221.1M | 23.7% | 649.0M | 121.4M | 31.1% | 132.2M | 24.8M | 21.1% | 192.0M | 24.7M | 8.1% | 36.6M | 10.0M | 40.8% | 94.7M | 29.8M | 38.9% | 42.5M | 10.1M |
| SMALL BUSINESS OWNERS DECISION MAKERS-NBCU IDS ⬀ / CROSS PLATFORM I 3P I B2B I • FW | -- | 1.1B | 206.7M | 22.1% | 650.7M | 3.3M | 1% | 99.4M | 19.8M | 16.6% | 278.2M | 126.8M | 41.4% | 30.1M | 10.9M | 44.2% | 84.9M | 37.9M | 49.5% | 13.8M | 7.3M |
| MID LARGE CORPORATIONS BUSINESS DECISIONMAKERS-NBCU IDS ⬀ / CROSS PLATFORM I 3P I FINANCE I • FW | -- | 891.3M | 162.4M | 17.4% | 500.9M | 3.0M | <1% | 76.9M | 15.5M | 13.2% | 216.6M | 99.6M | 32.5% | 22.3M | 8.4M | 34.3% | 63.7M | 29.9M | 39.1% | 10.6M | 5.8M |
| CULTURALLY CONNECTED-LGBTQT LAL-IP-0301 ⬀ / CROSS PLATFORM I • FW | -- | 667.3M | 147.1M | 15.7% | 357.4M | 77.8M | 19.9% | 87.4M | 17.7M | 15.1% | 131.4M | 20.2M | 6.6% | 15.3M | 5.3M | 21.4% | 43.0M | 17.0M | 22.3% | 32.5M | 8.9M |

SYSTEMS AND METHODS FOR EVALUATING CUSTOM AUDIENCE SEGMENTS

BACKGROUND

The present disclosure relates generally to digital content and more specifically to techniques that may be utilized when determining electronic devices or users to which to provide supplemental content with the digital content.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In media and entertainment, advertisers want to target content to audiences with specific characteristics. These audience characteristics may include demographics, past purchases, product preferences, personal interests, etc. Publishers and content presenters who deliver content with advertising to viewers may have information on segments of viewers (or audience segments) that can be targeted. For example, a publisher may have a segment coffee drinkers with 30 million viewers and a segment viewers between the ages of 25-54 with 84 million viewers. If an advertiser requests to target coffee drinkers and viewers between the ages of 25-54, a publisher may be tempted to add the total viewers from both segments and promise the advertiser the ability to target 114 million unique viewers. However, this summation does not consider the overlap of the two segments in which some of the coffee drinkers may also comprise some of the viewers between the ages of 25-54. A failure to consider the overlap would mean that the publisher is unable to deliver the 114 million unique viewers to the advertiser, requiring the publisher to make good on the shortfall by offering the advertiser additional ad inventory at little to no cost. Due to the size of the segments (e.g., millions or tens of millions of viewers and/or entries), current techniques may require hours if not days to generate a custom audience segment that combines multiple audience segments while excluding overlapping entries. A need exists to perform this estimation more quickly and accurately in a matter of milliseconds.

BRIEF DESCRIPTION

In one embodiment, a non-transitory, computer-readable medium includes instructions, that, when executed by processing circuitry, cause the processing circuitry to receive a request regarding a custom segment from an electronic device, The custom segment is defined by a first Boolean expression of a plurality of segments, and the plurality of segments include elements corresponding to, or representative of, one or more electronic devices, one or more users of the one or more electronic devices, or both the one or more electronic devices and the one or more users. The instructions, when executed, also cause the processing circuitry to generate a second Boolean expression based on the first Boolean expression and the plurality of segments. The second Boolean expression is different from the first Boolean expression. Additionally, the instructions, when executed, cause the processing circuitry to determine a number of distinct elements of the custom segment at least partially by utilizing a plurality of data structures corresponding to the plurality of segments and by utilizing the second Boolean expression. Furthermore, instructions, when executed, cause the processing circuitry to send, to the electronic device, an indication of the number of distinct elements of the custom segment.

In another embodiment, a system includes processing circuitry and a non-transitory, computer-readable medium that includes instructions, that, when executed by the processing circuitry, cause the processing circuitry to receive a request regarding a custom segment from an electronic device, wherein the custom segment is defined by a first Boolean expression of a plurality of segments, wherein the plurality of segments includes elements corresponding to, or representative of, one or more electronic devices, one or more users of the one or more electronic devices, or both the one or more electronic devices and the one or more users. When executed, the instructions also cause the processing circuitry to determine a number of distinct elements of the custom segment at least partially by 1) utilizing a Hyperloglog algorithm and a plurality of Hyperloglog data structures corresponding to the plurality of segments and 2) redefining the first Boolean expression as a second Boolean expression that differs from the first Boolean expression. Moreover, when executed, the instructions cause the processing circuitry to send, to the electronic device, an indication of the number of distinct elements of the custom segment.

In yet another embodiment, a computer-implemented method includes receiving, via processing circuitry, a request regarding a custom segment from an electronic device. The custom segment is defined by a first Boolean expression of a plurality of segments, and the plurality of segments includes elements corresponding to, or representative of, one or more electronic devices, one or more users of the one or more electronic devices, or both the one or more electronic devices and the one or more users. The computer-implemented method also includes determining, via the processing circuitry, a number of distinct elements of the custom segment at least partially by 1) utilizing a Hyperloglog algorithm and a plurality of Hyperloglog data structures corresponding to the plurality of segments and 2) redefining the first Boolean expression as a second Boolean expression that differs from the first Boolean expression. The first Boolean expression includes an intersection operation between a first segment of the plurality of segments and a second segment of the plurality of segments, an exclude operation between the first segment and the second segment, or both the intersection operation and the exclude operation. Furthermore, the computer-implemented method includes sending, via the processing circuitry and to the electronic device, an indication of the number of distinct elements of the custom segment.

BRIEF DESCRIPTION OF THE DRAWINGS

FIG. 4 illustrates another user interface of the segment manager of FIG. 1 that visualizes overlaps between segments, in accordance with one or more embodiments of the present disclosure.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
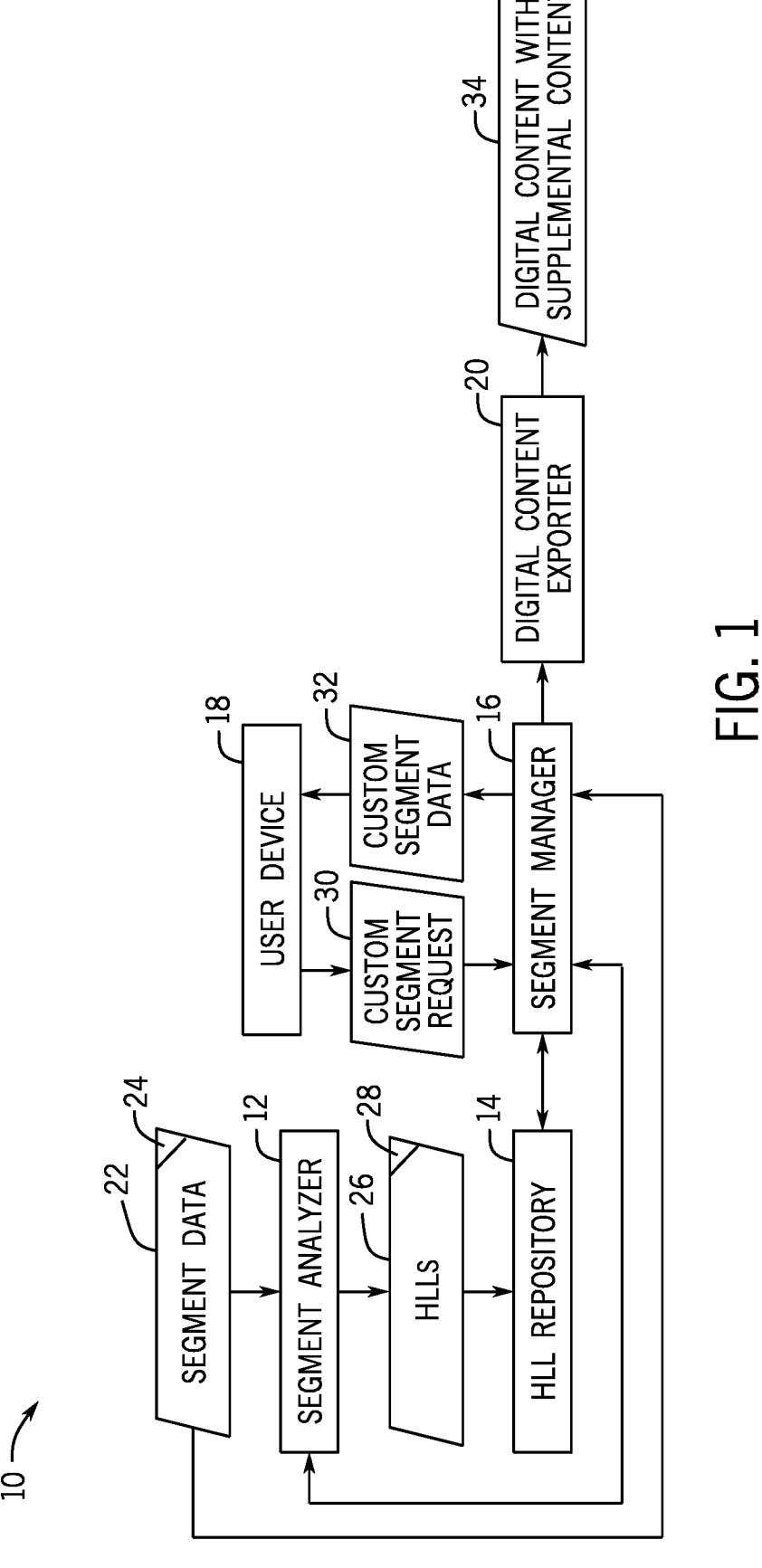
FIG. 1 is a block diagram of a system configured to manage data regarding segments, estimate sizes of custom segments, and enable supplemental content (e.g., advertisements) to be generated and/or provided with digital content (e.g., video or music content), in accordance with one or more embodiments of the present disclosure.

Turning now to the drawings, FIG. 1 is a block diagram of a system 10 configured to manage data regarding segments, estimate sizes of custom segments (e.g., a custom audience segment), and enable supplemental content (e.g., advertisements) to be generated and/or provided with digital content (e.g., video or music content). Accordingly, the system 10 may be utilized to provide advertisements (with digital content) targeted to particular groups and/or amounts of users, devices, or households which, as discussed below, may be defined by segments managed by the system 10.

As illustrated, the system 10 includes a segment analyzer 12, a repository 14, a segment manager 16, a user device 18, and a digital content exporter 20. In an aspect, although FIG. 1 depicts the segment analyzer 12 and the segment manager 16 as separate components, the segment analyzer 12 and the segment manager 16 may be the same or a single component or separate components that make up a single component or module. The system 10 and components thereof (e.g., the segment analyzer 12, the repository 14, the segment manager 16, the user device 18, and the digital content exporter 20) may be implemented using hardware, software, or a combination thereof. For example, in some embodiments, the system 10 or portions thereof may be implemented by one or more computing devices that may include or be communicatively coupled to memory and/or storage that includes machine-readable instructions that can be executed by processing circuitry (e.g., one or more processors (e.g., general-purpose microprocessors), programmable logic devices (PLDs), application-specific integrated circuits (ASICs), digital signal processors (DSPs), controllers, microcontrollers, state machines, gated logic, discrete hardware components, dedicated hardware finite state machines, or any other suitable entities that may perform calculations or other manipulations of information) the one or more computing devices. In such embodiments, portions of the system 10 may be implemented by the processing circuitry executing the machine-readable instructions. Accordingly, the techniques described herein may be implemented at least partially by processing circuitry executing instructions stored on one or more tangible, non-transitory, machine-readable (e.g., computer-readable) media. That is, programs or instructions executed by the processing circuitry may be stored in any suitable article(s) of manufacture for storing data and executable instructions, such as, but not limited to, random-access memory, read-only memory, rewritable flash memory, hard drives, and optical discs.

The segment analyzer 12 may receive segment data 22, which may include data regarding particular segments such as audience segments. In an aspect, each segment may include millions of entries, and each entry may correspond to a viewer and one or more unique IDs associated with the viewer (e.g., IP address, user ID, and/or device ID). All entries or viewers within the same segment may share one or more common characteristics such as an age range, gender, a past product purchase, a shared content viewing history, a personal preference, user of a specific device type, etc. In an aspect, the segment data 22 may be sent to the segment analyzer 12 by one or more entities (e.g., companies, people, businesses) that manage the segment manager 16. For example, the segment data 22 may be generated by entities that create or disseminate digital content (e.g., via broadcasting (for consumption via television) or over the Internet), monitor or track consumption (e.g., viewership) of the digital content, or any other entity that provides data regarding one or more segments of the segment data 22. As discussed herein, a segment may provide a particular grouping (e.g., of people, devices, households, etc.) based on one or more characteristics. In another aspect, the segment data 22 may be a grouping of multiple individual or distinct segments (e.g., two or more to thousands or tens of thousands of segments). Examples of characteristics used to define segments could include age groups, demographic information, geographic location, interest in the content (e.g., regarding genres of content, topics of the content, language of the content, or other features of the content), subscriptions (e.g., to cable services or streaming services), products purchased (e.g., coffee drinkers, tea drinkers, pizza eaters), device types (e.g., televisions, mobile devices such as cell phones) or any other discernable feature suitable for defining a group or groups of content consumers (or potential content consumers).

The segments of the segment data 22 may contain identifiers 24. That is, the identifiers 24 may be associated with or indicative of a particular feature of the segments of the segment data 22. For example, the identifiers 24 may be indicative of the trait or characteristic (or traits or characteristics) that defines a segment, a source (or sources) of the segment, other information about a user (e.g., content consumer) or users in the segment and/or electronic devices used to view content (e.g., name, IP address, device type, subscriptions, etc.). The identifiers 24 may be specific to the source(s) of the segment data 22. In other words, each source of one or more segments of the segment data 22 may be a separate entity that has its own identifiers 24.

The segment analyzer 12, which may be implemented in a cloud-computing environment, may receive and analyze the segment data 22. In some embodiments, the segment analyzer 12 may also include storage utilized to store segments (e.g., as received or after processing by the segment analyzer 12). The segment analyzer 12 may process the received segment data 22, for example, to determine segments of the segment data, catalog segments of the segment data 22, characterize the segment data 22 (e.g., based on the identifiers 24), anonymize identifiers 24 of the segment data 22, and generate data structures (e.g., Hyperloglog data structures, which may be referred to as Hyperloglogs (HLLs) 26) of (or based on) the segments of the segment data 22. For instance, the segment analyzer 12 may execute instructions to implement a Hyperloglog algorithm to generate the HLLs 26, which are data structures that enable the size estimation of corresponding segments. In particular, the Hyperloglog algorithm is an algorithm that may be used to estimate the number of elements in a set. For instance, in the Hyperlog algorithm a hash function may be applied to elements in a dataset (e.g., identifiers associated with users or user devices) to generate one or more of the HLLs, which may include uniformly distributed binary outputs of the has function. As such, the HLLs 26 may be data structures that enable the estimation of the number of people, users, devices, households, or other unit within the segments of the segment data 22. Each segment of the segment data 22 may have a corresponding HLL (of the HLLs 26), and the HLLs 26 may be stored in the repository 14. The repository 14 may be or include any suitable memory of storage. For example, the segment analyzer 12 may receive segment data 22 associated with coffee drinkers. Each coffee drinker in the segment may be associated with one or more identifiers such as an IP address, a user ID, and/or a device ID. The segment analyzer 12 may generate HLLs from the segment data 22 based on the different ID types. For example, the segment analyzer 12 may generate a first HLL based on the IP addresses of each viewer (or coffee drinker) in the segment data 22, a second HLL based on the user IDs of each viewer in the segment data 22, and a third HLL based on the device IDs of each viewer in the segment data 22. The HLLs 26 are then stored in the HLL repository 14. When an HLL is generated, the IDs become obfuscated. For example, the first HLL generated based on the IP addresses of each viewer does not contain any IP addresses or identifying information associated with any viewer. The first HLL merely contains a hash of 0s and 1s based on the IP addresses. In an aspect, separate HLLs are generated for different ID types because the HLL algorithm cannot combine or operate on HLLs with different ID types (e.g., IP address and device ID). The HLL algorithm must operate on HLLs with the same ID type (e.g., IP address and IP address).

After the HLLs 26 are generated, the segment analyzer 12 may generate custom HLLs by executing a Boolean operation (e.g., OR) on two or more HLLs having the same ID type (e.g., an HLL generated based on IP addresses can be combined with another HLL generated based on IP addresses). As previously noted, Booleans operations cannot be performed on HLLs generated based on different ID types (e.g., an HLL generated based on IP addresses cannot be combined with another HLL generated based on device IDs). As discussed below, the HLLs 26 may be utilized to estimate a cardinality of custom segments or a number of unique elements (e.g., unique viewers or users) in custom segments. This may enable accurate estimation, for example, of the number of unique impressions an advertisement may have if the advertisement were included with digital content provided to viewers of the custom segment.

The segment analyzer 12 may also characterize the segment data 22 to generate metadata 28 that may be included in, or associated with, the HLLs 26. For example, the metadata 28 may be indicative of an identity (e.g., a name) of a segment or segments of the segment data or a trait, characteristic, or discerning factor that otherwise identifies a segment (or segments). For instance, while the identifiers 24 may utilize custom names or codes specific to the one or more entities which may obfuscate a defining characteristic of items in a segment, the metadata 28 may indicate the defining characteristic. For example, in the context of the defining characteristic being an age or age range, the identifier 24 for the segment may not indicate (e.g., when read) the age or age range. However, the metadata 28 (e.g., when provided in visual form) may indicate the age or age range or define a name displayed with a representation of the segment (or the corresponding HLL 26 for the segment). In this manner, the system 10 (and, more specifically, the segment analyzer 12) may anonymize the identifiers 24 provided by multiple entities while ultimately enabling a user (e.g., of the user device 18) to discern defining characteristics of the segments of the segment data 22.

The segment manager 16, which may be implemented by executing computer-readable instructions (e.g., a program or application) by processing circuitry (e.g., of a server or other computing device), manages the segments of the segment data 22. For example, the segment manager 16 may provide user interfaces that enable users (e.g., of the user device) to, among other things, view segments, data regarding the segments (e.g., names of segments, sizes of segments, and generate new segments. In other words, the segment manager 16 may be utilized to make a new segment, which may be customized by a user of the user device 18. The user device 18 may be any suitable computing device capable of executing computer-readable instructions, for example, to access the segment manager 16 (e.g., via the Internet or any suitable wired or wireless connection). Accordingly, the segment manager 16 may have access to the segment data 22 (e.g., via the segment analyzer 12) and the HLLs 26 (e.g., stored in the repository 28), and the user device 18 may access the segment data 22 and the HLLs 26 via the segment manager 16.

In particular, a user may interact with the user device (e.g., via a graphical user interface (GUI) provided via a display of the user device 18) to select two or more segments of the segment data 22 to be utilized to generate a new, custom segment. For example, the user may utilize one or more Boolean operators (e.g., AND, OR, NOT) with multiple segments to define a new segment. As an example, a new segment may be defined as the intersection of a first segment and a second segment of the segment data 22 without any duplicates, meaning the new segment may be the data items (e.g., people, devices, households) found in both the first segment and the second segment. In other words, the new segment may be defined, at least in part, using an AND Boolean operator applied to the first segment and the second segment. As another example, the new segment may be defined as data items found in the first segment and not in the second segment (e.g., using a NOT Boolean operator).

Turning briefly to HLL capabilities, the existing HLL capabilities enable users to add, count, and merge HLLs. That is, users may add element(s) to an HLL set resulting in a new HLL set. Users may compute the cardinality of an HLL set resulting in a value. Users may also merge (OR operation) two HLL sets to obtain a new HLL set representing the union of two sets. The HLL algorithm does not, however, provide for a remove operation (to remove one or more elements from an HLL set) or an AND operation (to obtain an intersection of two HLL sets). This application will describe a new technique to enable a remove operation and an AND operation (intersection operation) in HLL sets.

Returning to FIG. 1, in response to receiving a user input to make a new segment (e.g., a custom segment), the user device 18 may send a custom segment request 30 to the segment manager 16 indicating what the custom segment is. For example, the custom segment request 30 may indicate segments of the segment data 22 and Boolean operators associated with the segments. As discussed below with respect to FIG. 2, the system 10 (and more specifically, the segment manager 16) may perform several operations upon receiving the custom segment request 30.

Figure 2:
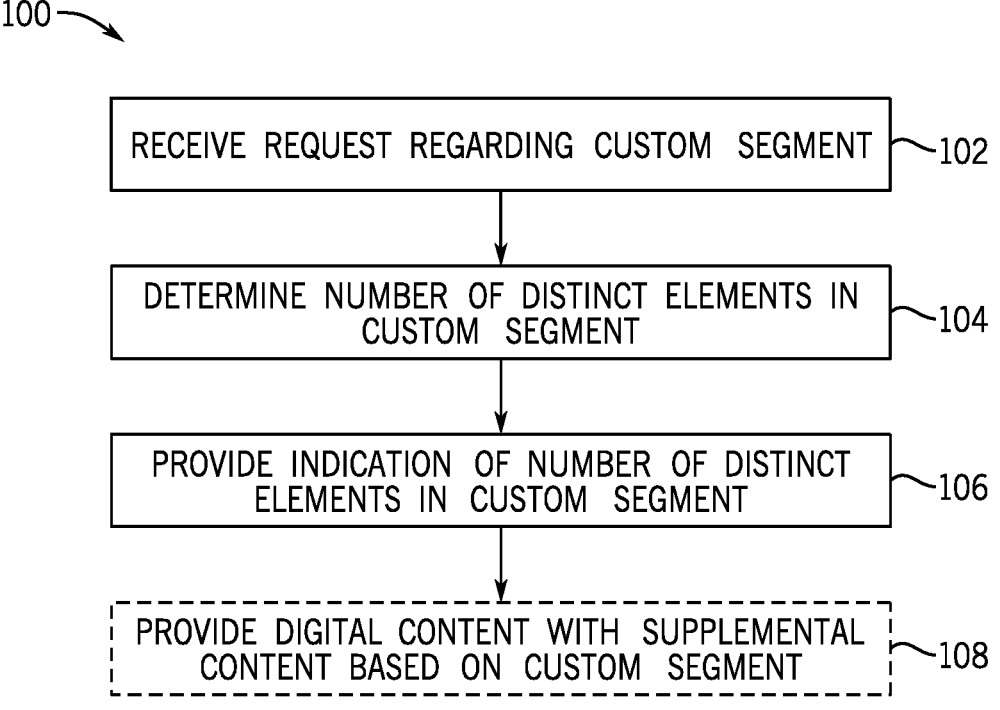
FIG. 2 is a flow diagram of a process for estimating the size (e.g., number of unique elements) of a custom segment generated by the system of FIG. 1, in accordance with one or more embodiments of the present disclosure.

To help elaborate, FIG. 2 is a flow diagram of a process 100 for estimating the size (e.g., number of unique elements) of a custom segment. The process 100 may be performed, for example, by processing circuitry executing computer-readable instructions stored on a non-transitory medium. Thus, the process 100 may be performed wholly or in part by the segment manager 16 (which may include the segment analyzer 12).

At process block 102, the segment manager 16 may receive a request regarding a custom segment. Referring briefly to FIG. 1, such a request may be the custom segment request 30. Accordingly, at process block 102, the segment manager 16 may receive a request for a new segment that is defined by several existing segments and one or more Boolean operators. The new segment may be defined by any suitable number of existing segments. For example, one new segment could be defined based on two segments, whereas another new segment may be defined based on more than two segments (e.g., three, ten, twenty, or more segments).

Returning to FIG. 2 and the discussion of the process 100, in response to receiving the request regarding a custom segment, at process block 104, the segment manager 16 may determine (e.g., estimate) a number of distinct elements in the custom segment. This may be referred to as determining the cardinality of the custom segment. The segment manager 16 may determine the number of distinct elements in the custom segment utilizing the HLLs corresponding to the segments (of the segment data 22) used to define the custom the segment and/or the Hyperloglog algorithm. The Hyperloglog algorithm may be utilized for certain operations, such as adding an element to a segment, determining the number of distinct elements in a segment, and merging two segments to obtain a union of the two segments. To help provide more context for determining the number of distinct elements in the custom segment, several examples of different custom segments are discussed below.

In a first example, the custom segment may be defined as the union of three segments (e.g., segment A, segment B, segment C). In other words, the custom segment may be defined as including any element that is found in segment A, segment B, or segment C, thereby corresponding to two OR Boolean operations (e.g., segment A OR segment B OR segment C). Because HLLs can represent a union of two datasets, HLLs for the OR operations may be present in the HLLs 26 (or such HLLs can be generated by the segment analyzer 12). Thus, the segment manager 16 may request (e.g., from the segment analyzer 12 and/or repository 14) a first HLL of the HLLs 26 corresponding to segment A OR segment B and a second HLL of the HLLs 26 corresponding to segment B OR segment C. The segment manager may then merge (perform an OR operation on) the first and second HLLs to generate in a third HLL (e.g., defined as (segment A OR segment B OR segment C) representing the union of the three segments, which the segment manager 16 may utilize to determine (or estimate) the number of elements in segment A, segment B, and segment C. Such an operation may be referred to as a "merge" operation that may be performed utilizing the Hyperloglog algorithm.

As described above, the existing Hyperloglog algorithm does not allow several operations. For example, in a second scenario, the custom segment may be defined as segment A AND segment B OR segment C, which may be the intersection of two HLLs corresponding to segments A and B (e.g., the portions of two HLLs that are shared and not unique to just one HLL). In such a scenario, the existing Hyperloglog algorithm may be unable to provide an estimate of the custom segment, for instance, because there is not an AND (e.g., intersection) operation supported by the existing HLL algorithm. However, the system 10 (e.g., via the segment manager 16 and/or segment analyzer 12), may redefine the custom segment (or the operations associated with the custom segment) to enable the Hyperloglog algorithm to be utilized to estimate the number of distinct elements in the custom segment.

To help provide more context, segment A AND segment B OR segment C could be defined as (segment A AND segment B) OR segment C, in which an estimate of the "(segment A AND segment B)" could be provided (e.g., using an HLL or HLLs for segment A and segment B). However, it may not be possible for the HLL algorithm to compare the estimate with an HLL (representative of segment C) because the numerical estimate of "(segment A AND segment B)" and the HLL that represents segment C are two different formats (i.e., a numerical value and an HLL set). In other words, when an odd number of HLLs would be utilized (or an even number of Boolean operators) to define a custom segment, the Hyperloglog algorithm may not be utilizable to estimate the number of unique elements in the custom segment.

To resolve this, the system 10 (e.g., via the segment manager 16 and/or segment analyzer 12), may redefine the custom segment (or a query regarding the custom segment) utilizing the conjunctive normal form in which the Boolean expression for the custom segment is redefined as an AND operation of several OR operations in which the OR operations are evaluated first. As such, segment A AND segment B OR segment C may be redefined as (segment A OR segment C) AND (segment B OR segment C), which can be evaluated by the Hyperloglog algorithm. In other words, by generating an intermediate Boolean expression based on the initial Boolean expression and segments, the system 10 may redefine the custom segment to enable the Hyperloglog algorithm to be utilized to perform intersection operations. Thus, the system 10 may determine the number of unique elements in a custom segment that is defined as the intersection (e.g., logical AND) of multiple segments (e.g., an odd number of segments greater than one), for example, by redefining the custom segment to utilize an even number of HLLs (and/or an odd number of Boolean operators).

As noted above, since the HLL algorithm does not support an interaction (or AND) operation, intersection operations (represented using "∩") may be performed as (or substituted by) $|X \cap Y| = |X| + |Y| - |X \cup Y|$, each element of which can be evaluated using HLLs and/or the Hyperloglog algorithm where the | | operation is a cardinality operation that returns the cardinality of a set. For example, $|X|$ may be evaluated using the Hyperloglog algorithm (as an estimation of the number of unique elements in X), $|Y|$ may be evaluated using the Hyperloglog algorithm (as an estimation of the number of unique elements in Y), and $|X \cup Y|$ (corresponding to an estimation of the number of unique elements in the union of X and Y) may be evaluated using an HLL corresponding to X OR Y. Apply the foregoing principles to the second scenario, the result of segment A OR segment C may correspond to X and the result of segment B OR segment C may correspond to Y, and the evaluation of (segment A OR segment C) AND (segment B OR segment C) may be determined by evaluating $|X|+|Y|-|X \cup Y|$. As such, the intermediate Boolean expression generated by the system 10 excludes one or more Boolean operations (e.g., AND operation) from the initial Boolean expression.

In a third example, the custom segment may be defined as segment A NOT segment B (e.g., $|A \cap \neg B|$), meaning elements among segment A and segment B that are unique to segment A are the elements of the custom segment. Similar to the second example, this operation (which may be referred to as an "exclude operation" or "remove operation") may not be performable using the Hyperloglog algorithm. However, such a custom segment may be defined such that $|A \cap \neg B| = |A| - |A \cap B|$, and therefore be evaluated using the Hyperloglog algorithm. In other words, the system 10 (e.g., via the segment manager 16 and/or segment analyzer 12) may redefine a custom segment defined as an exclude operation of two segments as a difference between a first number of unique elements in a first segment (which can be determined using the HLL algorithm) and a second number of elements corresponding to the intersection of the first segment and a second segment. As described above, the intersection of segments may be evaluated by redefining the intersection operation (e.g., using a union operation and/or a conjunctive normal form of a Boolean expression) such that $|A \cap \neg B| = |A| - (|A| + |B| - |A \cup B|) = |A \cup B| - |B|$ As such, similar to when an intersection operation is requested, when a remove operation is requested, the system 10 may generate one or more intermediate Boolean expressions and redefine the custom segment. One point to note is that the intermediate Boolean expression excludes one or more Boolean operations (e.g., NOT operation) from the initial Boolean expression. In this manner, the segment manager 16 and/or segment analyzer 12 may utilize the HLLs 26 and the Hyperloglog algorithm to perform exclude operations even though exclude operations are not natively performable by the Hyperloglog algorithm. Accordingly, the techniques of the present disclosure may enable computing devices to have expanded functionality by redefining custom segments in terms that can be evaluated using the Hyperloglog algorithm (and the HLLs 26).

Continuing with the discussion of the process 100, at process block 106, segment manager 16 may provide an indication of the number of distinct elements in the custom segment (e.g., as determined at process block 104). For example, and referring briefly to FIG. 1, the segment manager 16 may generate and send custom segment data 32 to the user device 18, and the custom segment data 32 may include the estimate of the number of distinct elements in the custom segment. The custom segment data 32 (or a representation of the custom segment data 32) may be displayed via a display of the user device 18 to visually indicate to a user of the user device 18 the size of the custom segment.

Returning to FIG. 2 and the discussion of the process 100, in some embodiments, the process 100 may also include process block 108, at which the system 10 may provide digital content with supplemental content based on the custom segment. In the context of FIG. 1, the digital content exporter 20 may provide digital content with supplemental content 34, in which the supplemental content may be one or more advertisements that are presented with or in between portions of the digital content (e.g., video or audio content). The digital content exporter 20 may be hardware, software, or a combination thereof that associates the supplemental content with digital content. The digital content exporter 20 may enable particular advertisements to be presented for particular users, as defined by the custom segment. For example, when users who are included in the custom segment access the digital content, such users may be presented with one or more advertisements targeted toward the segment. In this manner, different content (e.g., supplemental content) may be dynamically provided to different users or people who access digital content based on one or more segments (e.g., custom segments) to which the user or people belong.

Figure 3:
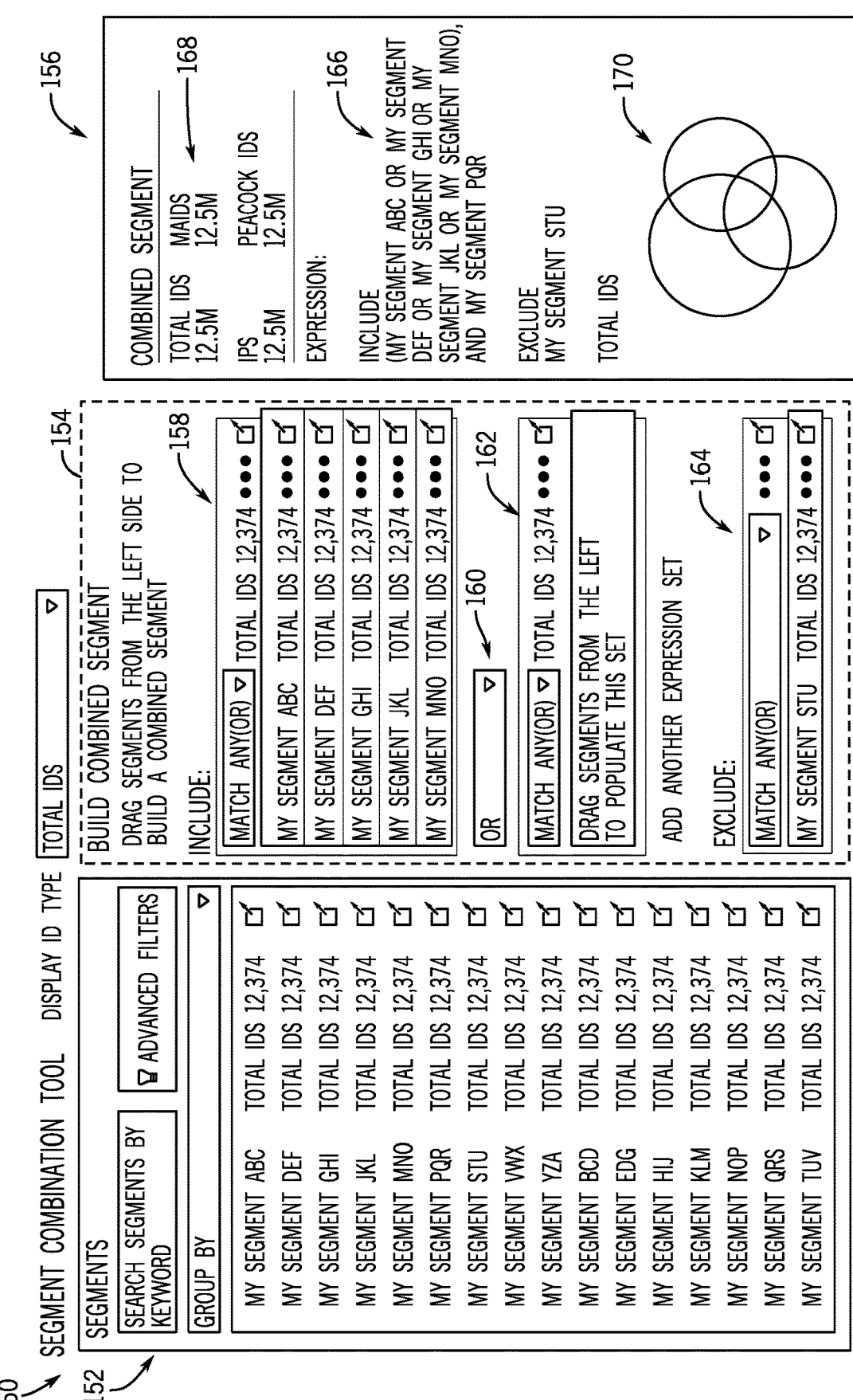
FIG. 3 illustrates a user interface of the segment manager of FIG. 1 that a user may utilized to make a new custom segment, in accordance with one or more embodiments of the present disclosure.

Continuing with the drawings, FIG. 3 illustrates a GUI 150 for a custom segment tool that may be displayed on a display of the user device 18. The GUI 150 may be rendered based on data received from the segment manager 16, including, but not limited to the custom segment data 32. In particular, a user of the user device 18 may interact with the GUI 150 (e.g., using one or more input devices of the user device, such as a mouse, keyboard, button, touchscreen, or a combination thereof) to view segments (e.g., of the segment data 22) in a segments section 152 of the GUI 150, build a custom segment in a custom segment section 154 of the GUI 150, and view information regarding the custom segment in a custom segment information section 156 of the GUI 150.

The segments section 152 of the GUI 150 may include visual indications of segments included in the segments of the segment data 22. For example, in FIG. 3, the visual indications of the segments include names of segments (e.g., "My Segment ABC") as well as other data regarding the segments, such as a number of identifiers (e.g., elements) included in a particular segment (e.g., "Total IDS 12,374"). The segments section 152 may also include one or more tools that enable a user to search segments as well as group and/or sort segments.

A user of the user device 18 may interact with the custom segment section 154 of the GUI 150 to generate a custom segment (e.g., a custom audience segment). Accordingly, the custom segment request 30 may be generated and/or received based on a user's interaction(s) with the custom segment section 154. In particular, the custom segment section 154 may include a first section 158 indicating segments to be included in a custom segment (e.g., "My Segment ABC," "My Segment DEF," "My Segment GHI," "My Segment JKL," "My Segment MNO"), amounts of identifiers (e.g., elements) included in a particular segment or the custom segment (e.g., "Total IDS 12,374"), and a Boolean operator associated with the segments (e.g., "Match Any (OR)"). A user may select a dropdown menu 160 to select a Boolean operator (e.g., OR, AND, NOT) for a segment to be included in the custom dataset, and a user may add a segment from the segments section 152 utilizing a second section 162 of the custom segment section (and such segments may appear in the first section 158 after being selected by the user). A third section 164 of the custom segment section 154 may be utilized for exclude operations. For example, a user may interact with the third section 164 to indicate one or more segments from the segments section 152 that should be excluded from the custom segment. Accordingly, a user may interact with the custom segment section 154 to define a custom segment based on existing segments, and the custom segment section may be defined by such segments using a Boolean expression (that includes one or more Boolean operators).

The custom segment information section 156 of the GUI 150 may provide (e.g., visually) information regarding the custom segment, including a Boolean expression 166 (or components thereof) that defines the custom segment, the number of distinct elements (e.g., identifiers 24) 168 in the custom segment (e.g., as determined in accordance with the process 100), a graphical representation 170 of the Boolean expression 166 that defines the custom segment (e.g., over-lapping circles corresponding to segments in the Boolean expression), or any combination thereof. As a user interacts with the custom segment section 154 of the GUI 150 (e.g., to add or remove segments from a custom segment), the system 10 may perform portions of the process 100 (e.g., operations associated with process block 102, process block 104, process block 106, or a combination thereof). As such, an updated value for the number of distinct elements (e.g., identifiers 24) in the custom segment may be determined, and such an updated value may be displayed in the custom segment information section 156 of the GUI 150 (e.g., as the number of distinct elements 168). As shown in the FIG. 3, the custom segment may be generated by analyzing tens of millions of identifiers (or more), and despite the high volume of data, the custom segment information may be generated and available within milliseconds or seconds. Additionally, the Boolean expression 166 and the graphical representation 170 of the Boolean expression 166 may be updated based on the user interaction with the GUI 150.

After the custom segment is generated, a user may select the custom segment as a target audience for an advertise-ment. The user may provide custom segment or the custom segment information to an ad server for targeting. For example, the custom segment may contain device IDs tar-getable by the ad server. By providing an accurate estimate of the size of the custom segment requested by the user or the advertiser, the techniques described will significantly improve ad targeting efficiency.

FIG. 4 illustrates a GUI 200 for a segment overlap tool that may be displayed on a display of the user device 18. The GUI 200 may be rendered based on data received from the segment manager 16, including, but not limited to the custom segment data 32. In particular, a user of the user device 18 may interact with the GUI 200 (e.g., using one or more input devices of the user device, such as a mouse, keyboard, button, touchscreen, or a combination thereof) to view overlap between segments (e.g., of the segment data 22). By utilizing the techniques described above (e.g., utilizing HLLs 28), segment overlap analysis may be per-formed relatively quickly (e.g., in less than one minute, less than thirty seconds, or less than ten seconds), and a result of such an analysis may be provided in the GUI 200. As there may be hundreds, thousands, tens of thousands, hundreds of thousands, or more segments, being able to visualize overlap between segments of the segment data 22 (as well as different identifiers 24) may be a valuable tool to aid a user in understanding overlaps between different segments. Accordingly, segment overlap analysis may be performed using the estimation techniques to generate the GUI 200 to enable a user to better understand overlaps between one segment one or more other segments.

For example, for a segment 202, the GUI 200 may provide a name of a selected segment (e.g., the segment 202) and identifier data 204, which may include the total number of identifiers 24 including in the segment 202 as well as the amounts of particular types of the identifiers 24 (e.g., IP addresses, streaming service identifiers, etc.). The GUI 200 may also several tools to help a user view overlaps between the segment 202 and one or more other particular segments. For example, the GUI 200 may include a search bay 206 that a user may utilize to search for a particular other segment to see the overlap between the segment 202 and the other segment. The GUI 200 may also include a grouping toolbar 208 (e.g., a dropdown menu) to allow a user to select particular groups or groupings of segments to be displayed in the GUI 200 (e.g., as overlapped against the segment 202). Additionally, the GUI 200 may include a campaign toolbar 210 (e.g., dropdown menu) that a user may use to select a particular advertising campaign. When a campaign is selected, the results of the overlap analysis between the segment 202 and the segments of the selected campaign may be displayed in the GUI 202. Furthermore, the GUI 200 may include an identifier type toolbar 212 (e.g., dropdown menu) from which a user may select one or more types of identifiers 24. Upon selection of one or more identifiers 24 in the identifier type toolbar 212, the overlap for the selected identifier(s) of the segment 202 and one or more other segments may be provided in the GUI 200.

The GUI 200 also includes representations of the overlap analyses of the segment 202 against other segments 214 (collectively referring to segment 214A, segment 214B, and segment 214C). For example, column 216 includes repre-sentations of overlaps between the segment 202 and the segments 214 for all types of identifiers 24 (e.g., in aggre-gate), such as representation 218 that represents the overlap between the segment 202 and the segment 214A. Data associated with each overlap (or representation of overlap such as the representation 218) may also be included, such as the total number of identifiers 204 in one of the segments 214 and the amount of those identifiers 24 that overlap with identifiers 24 of the segment 202 (e.g., a number and/or percentage). Other columns may be specific to particular types of identifiers 24. For example, the column 220 may be specific to IP addresses. Accordingly, representation 222 may show the overlap between IP addresses of the segment 202 and the segment 214A. A column may be included for each type of identifier 24 or, as discussed above, each type of identifier 24 selected by a user utilizing the identifier type toolbar 212. As such, the GUI 200 may visualize overlaps of identifiers 24 between segments.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are refer-enced and applied to material objects and concrete examples of a practical nature that demonstrably improve the present technical field and, as such, are not abstract, intangible or purely theoretical. Further, if any claims appended to the end of this specification contain one or more elements desig-nated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. A non-transitory, computer-readable medium compris-ing instructions, that, when executed by processing circuitry, cause the processing circuitry to:
render a custom segment graphical user interface (GUI);

generate a plurality of Hyperloglog data structures, each of the plurality of Hyperloglog data structures corresponding to a segment of a population of electronic devices, users of the electronic devices, or both having a common characteristic associated with that segment, wherein the Hyperloglog data structures comprise uniformly distributed outputs resulting from hashing identifiers associated with the population of electronic devices, the users of the electronic devices, or both, wherein the identifiers associated with the population of electronic devices comprise millions of identifiers;

receive, via the custom segment GUI, a request regarding a custom segment from an electronic device, wherein the custom segment is defined by a first Boolean expression of a plurality of segments, wherein the plurality of segments comprises elements corresponding to, or representative of, one or more electronic devices, one or more users of the one or more electronic devices, or both the one or more electronic devices and the one or more users, wherein: the first Boolean expression comprises:

a first Boolean intersection operation between a first segment of the plurality of segments and a second segment of the plurality of segments; and a second Boolean operation between a result of the first Boolean intersection operation and a third segment of the plurality of segments; and satisfy the request on demand, returning a response to the request within sub-minute time, using at least a portion of the plurality of Hyperloglog data structures, by:

identifying that the first Boolean expression comprises an intersection operation unsupported by an existing Hyperloglog algorithm of the processing circuitry;

in response to identifying that the first Boolean expression comprises the intersection operation unsupported by the existing Hyperloglog algorithm, redefine the custom segment by generating a second Boolean expression based on the first Boolean expression and the plurality of segments, wherein the second Boolean expression is different from the first Boolean expression, comprising:

a first portion corresponding to a third Boolean operation of the first segment and the third segment; and a second portion corresponding to a fourth Boolean operation of the second segment and the third segment;

determining a number of distinct elements of the custom segment at least partially by:

accessing a subset of the plurality of Hyperloglog data structures corresponding to one of the plurality of segments;

evaluating, via a Hyperloglog algorithm, the second Boolean expression utilizing the subset of the plurality of Hyperloglog data structures corresponding to the plurality of segments to obtain an indication of a number of distinct elements of the custom segment; and sending, to the electronic device, the indication of the number of distinct elements of the custom segment.

2. The non-transitory, computer-readable medium of claim 1, wherein:

the first Boolean expression comprises an odd number of segments of the plurality of segments and an even number of Boolean operators; and the second Boolean expression comprises an even number of segments of the plurality of segments and odd number of Boolean operators.

3. The non-transitory, computer-readable medium of claim 1, wherein the first Boolean expression comprises an exclude operation of a first segment of the plurality of segments and a second segment of the plurality of segments.

4. The non-transitory, computer-readable medium of claim 3, wherein the second Boolean expression comprises an intersection operation of the first segment of the plurality of segments and the second segment of the plurality of segments that is absent from the first Boolean expression.

5. The non-transitory, computer-readable medium of claim 1, wherein the instructions, when executed, cause the processing circuitry to cause supplemental content to be included with digital content provided to at least a portion of the one or more electronic devices of the one or more users included in the custom segment.

6. The non-transitory, computer-readable medium of claim 5, wherein the supplemental content comprises one or more advertisements.

7. A system, comprising:

processing circuitry; and a non-transitory, computer-readable medium comprising instructions, that, when executed by the processing circuitry, cause the processing circuitry to:

render a custom segment graphical user interface (GUI);

generate a plurality of Hyperloglog data structures, each of the plurality of Hyperloglog data structures corresponding to a segment of a population of electronic devices, users of the electronic devices, or both having a common characteristic associated with that segment, wherein the Hyperloglog data structures comprise outputs resulting from hashing identifiers associated with the population of electronic devices, the users of the electronic devices, or both, wherein the identifiers associated with the population of electronic devices comprise millions of identifiers;

receive, via the custom segment GUI, a request regarding a custom segment from an electronic device, wherein the custom segment is defined by a first Boolean expression of a plurality of segments, wherein the plurality of segments comprises elements corresponding to, or representative of, one or more electronic devices, one or more users of the one or more electronic devices, or both the one or more electronic devices and the one or more users, wherein: the first Boolean expression comprises:

a first Boolean intersection operation between a first segment of the plurality of segments and a second segment of the plurality of segments; and a second Boolean operation between a result of the first Boolean intersection operation and a third segment of the plurality of segments; and satisfy the request on demand, returning a response to the request within sub-minute time, using at least a portion of the plurality of Hyperloglog data structures, by:

identifying that the first Boolean expression comprises an intersection operation unsupported by an existing Hyperloglog algorithm of the processing circuitry;

in response to identifying that the first Boolean expression comprises the intersection operation unsupported by the existing Hyperloglog algorithm of the processing circuitry, redefine the custom segment by generating a second Boolean expression based on the first Boolean expression and the plurality of segments, wherein the second Boolean expression is different from the first Boolean expression, comprising:

a first portion corresponding to a third Boolean operation of the first segment and the third segment; and a second portion corresponding to a fourth Boolean operation of the second segment and the third segment;

determining a number of distinct elements of the custom segment at least partially by:

accessing a subset of the plurality of Hyperloglog data structures corresponding to one of the plurality of segments;

evaluating, via a Hyperloglog algorithm, the second Boolean expression utilizing the subset of the plurality of Hyperloglog data structures corresponding to the plurality of segments; and sending, to the electronic device, an indication of the number of distinct elements of the custom segment in a visualization of the custom segment GUI.

8. The system of claim 7, wherein:

the first Boolean expression comprises an exclude operation between the first segment and the second segment.

9. The system of claim 7, wherein each segment of the plurality of segments is defined by a plurality of identifiers indicative of the one or more electronic devices, the one or more users of the one or more electronic devices, or both the one or more electronic devices and the one or more users.

10. The system of claim 9, wherein the instructions, when executed, cause the processing circuitry to:

receive, from a first entity, first segment data comprising or indicative of a first portion of the plurality of segments and a first portion of the plurality of identifiers;

receive, from a second entity different than the first entity, second segment data comprising or indicative of a second portion of the plurality of segments and a second portion of the plurality of identifiers;

anonymize the plurality of identifiers;

generate metadata indicative of a characteristic of the one or more electronic devices, the one or more users of the one or more electronic devices, or both the one or more electronic devices, wherein the characteristic is shared between the first segment data and the second segment data; and generate, for display on an electronic display and based on the metadata, a user interface comprising a visual representation of a first segment of the plurality of segments, wherein the visual representation comprises a visual indicator indicative of the characteristic shared between the first segment data and the second segment data.

11. The system of claim 7, wherein the instructions, when executed, cause the processing circuitry to generate, for display on an electronic display, a user interface, wherein the user interface comprises:

a segment section indicative of the plurality of segments and a second plurality of segments that comprises segments other than those of the plurality of segments;

a custom segment section indicative of the plurality of segments and one or more Boolean operations of the first Boolean expression; and a custom segment information section that visually indicates the first Boolean expression, the number of distinct elements of the custom segment, or both the first Boolean expression and the number of distinct elements of the custom segment.

12. The system of claim 11, wherein:

the custom segment information section visually indicates the number of distinct elements of the custom segment; and the instructions, when executed, cause the processing circuitry to:

receive a request to add a segment of the second plurality of segments to the custom segment;

determine a second number of the custom segment accounting for the segment of the second plurality of segments being added to the custom segment; and send, to the electronic device, an indication of the second number of distinct elements of the custom segment to be used to modify the user interface such that the custom segment information section switches from visually indicating the number of distinct elements of the custom segment to visually indicating the second number of distinct elements of the custom segment.

13. A computer-implemented method, comprising:

rendering a custom segment graphical user interface (GUI);

generating a plurality of Hyperloglog data structures, each of the plurality of Hyperloglog data structures corresponding to a segment of a population of electronic devices, users of the electronic devices, or both having a common characteristic associated with that segment, wherein the Hyperloglog data structures comprise outputs resulting from hashing identifiers associated with the population of electronic devices, the users of the electronic devices, or both, wherein the identifiers associated with the population of electronic devices comprise millions of identifiers;

receiving, via processing circuitry, from the custom segment GUI, a request regarding a custom segment from an electronic device, wherein the custom segment is defined by a first Boolean expression of a plurality of segments, wherein the plurality of segments comprises elements corresponding to, or representative of, one or more electronic devices, one or more users of the one or more electronic devices, or both the one or more electronic devices and the one or more users, wherein:

the first Boolean expression comprises:

a first Boolean intersection operation between a first segment of the plurality of segments and a second segment of the plurality of segments; and a second Boolean operation between a result of the first Boolean intersection operation and a third segment of the plurality of segments;

satisfying the request on demand, returning a response to the request within sub-minute time, using at least a portion of the plurality of Hyperloglog data structures, by:

identifying that the first Boolean expression comprises an intersection operation unsupported by an existing Hyperloglog algorithm of the processing circuitry;

in response to identifying that the first Boolean expression comprises the intersection operation unsupported by the existing Hyperloglog algorithm of the processing circuitry, redefine the custom segment by generating a second Boolean expression based on the first Boolean expression and the plurality of segments, wherein the second Boolean expression is different from the first Boolean expression and comprises:

a first portion corresponding to a third Boolean operation of the first segment and the third segment; and a second portion corresponding to a fourth Boolean operation of the second segment and the third segment;

determining, via the processing circuitry, a number of distinct elements of the custom segment at least partially by:

accessing a subset of the plurality of Hyperloglog data structures corresponding to one of the plurality of segments; and evaluating, via the Hyperloglog algorithm, the second Boolean expression utilizing the subset of the plurality of Hyperloglog data structures corresponding to the plurality of segments to obtain an indication of a number of distinct elements of the custom segment; and sending, via the processing circuitry and to the electronic device, an indication of the number of distinct elements of the custom segment in a visualization of the custom segment GUI.

14. The computer-implemented method of claim 13, wherein:

the first Boolean expression comprises the intersection operation; and the second Boolean expression comprises a union operation that is absent from the first Boolean expression.

15. The computer-implemented method of claim 13, comprising causing, via the processing circuitry, one or more advertisements to be included with digital content provided to at least a portion of the one or more electronic devices of the one or more users included in the custom segment.

16. The non-transitory, computer-readable medium of claim 1, wherein:

generating the second Boolean expression comprises transforming the first Boolean expression into a conjunctive normal form (CNF) such that the intersection operation is eliminated from the second Boolean expression and replaced by union operations between the third segment and each of the first segment and the second segment.

\* \* \* \* \*